United States Patent
Longman et al.

(10) Patent No.: US 11,294,030 B2
(45) Date of Patent: Apr. 5, 2022

(54) ADAPTIVE RANGE-SELECTIVE GAIN CONTROL IN RADAR SYSTEM

(71) Applicant: GM Global Technology Operations LLC, Detroit, MI (US)

(72) Inventors: Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 445 days.

(21) Appl. No.: 16/373,117

(22) Filed: Apr. 2, 2019

(65) Prior Publication Data

US 2020/0319295 A1    Oct. 8, 2020

(51) Int. Cl.
*G01S 7/35*    (2006.01)
*G01S 13/34*   (2006.01)
*G01S 13/931*  (2020.01)

(52) U.S. Cl.
CPC .............. *G01S 7/352* (2013.01); *G01S 13/34* (2013.01); *G01S 13/931* (2013.01)

(58) Field of Classification Search
CPC .......... G01S 7/34; G01S 7/489; G01S 7/4918; G01S 7/52033; G01S 7/529; G01S 7/5345; G01S 13/931
See application file for complete search history.

(56) References Cited

U.S. PATENT DOCUMENTS

| | | | | |
|---|---|---|---|---|
| 3,719,942 A | * | 3/1973 | Herman | G01S 13/64 342/92 |
| 3,781,882 A | * | 12/1973 | Holberg | G01S 7/34 342/92 |
| 3,797,014 A | * | 3/1974 | Tompkins | G01S 7/2923 342/90 |
| 3,845,481 A | * | 10/1974 | Danzer | G01S 13/72 342/92 |
| 3,876,946 A | * | 4/1975 | La Clair | G01R 23/18 702/77 |
| 4,680,588 A | * | 7/1987 | Cantwell | H03G 3/3052 342/92 |
| 4,901,083 A | * | 2/1990 | May | G01S 13/931 342/128 |
| 5,293,325 A | * | 3/1994 | Roos | G01S 7/4021 342/174 |
| 5,910,786 A | * | 6/1999 | Watanabe | G01S 13/931 342/70 |
| 6,087,976 A | * | 7/2000 | Reed | G01S 7/352 342/70 |

(Continued)

*Primary Examiner* — Peter M Bythrow
(74) *Attorney, Agent, or Firm* — Cantor Colburn LLP

(57) ABSTRACT

A method and system include transmitting transmit signals from a radar system. The transmit signals are linear frequency modulated continuous wave signals. The method includes receiving reflected signals at the radar system based on reflection of at least at subset of the transmit signals by one or more objects. A range from the radar system associated with each of the reflected signals corresponds with a frequency of the reflected signal. The reflected signals are processed to identify and locate the one or more objects. Processing includes applying an adaptive range-selective gain control (ARSGC) to control a gain corresponding with each of the reflected signals based on the range associated with the reflected signal.

20 Claims, 4 Drawing Sheets

(56) References Cited

U.S. PATENT DOCUMENTS

| | | | | |
|---|---|---|---|---|
| 6,218,981 B1* | 4/2001 | Uehara | .................... | G01S 7/34 |
| | | | | 342/107 |
| 2003/0100285 A1* | 5/2003 | Puglia | .................. | G01S 7/0234 |
| | | | | 455/293 |
| 2003/0210182 A1* | 11/2003 | Hanson | .................... | H01Q 3/40 |
| | | | | 342/175 |
| 2004/0095269 A1* | 5/2004 | Uehara | .................... | G01S 7/36 |
| | | | | 342/92 |
| 2005/0093736 A1* | 5/2005 | Fukute | .................. | G01S 7/411 |
| | | | | 342/70 |
| 2006/0044180 A1* | 3/2006 | Ikeda | .................. | G01S 13/931 |
| | | | | 342/91 |
| 2007/0216567 A1* | 9/2007 | Ikeda | .................. | G01S 13/931 |
| | | | | 342/92 |
| 2008/0158046 A1* | 7/2008 | Kai | ...................... | G01S 7/4004 |
| | | | | 342/118 |
| 2016/0131753 A1* | 5/2016 | Brown | ................. | G01S 13/931 |
| | | | | 342/128 |
| 2016/0154092 A1* | 6/2016 | Pavao-Moreira | ........................... | |
| | | | | H03K 19/017509 |
| | | | | 342/175 |

* cited by examiner

US 11,294,030 B2

ADAPTIVE RANGE-SELECTIVE GAIN CONTROL IN RADAR SYSTEM

INTRODUCTION

The subject disclosure relates to adaptive range-selective gain control in a radar system.

Sensors, such as radar systems, are increasingly used in vehicles (e.g., automobile, truck, construction equipment, farm equipment, automated factory equipment). Information from the sensors about objects in the vicinity of the vehicle facilitate augmenting or automating vehicle operations (e.g., collision avoidance, adaptive cruise control, autonomous driving). The radar system may transmit a linear frequency modulated continuous wave (LFM CW) signal, referred to as a chirp, rather than pulses, for example. An LFM CW radar system simultaneously detects strong and weak signals. Accordingly, it is desirable to provide adaptive range-selective gain control in a radar system.

SUMMARY

In one exemplary embodiment, a method includes transmitting transmit signals from a radar system. The transmit signals are linear frequency modulated continuous wave signals. The method also includes receiving reflected signals at the radar system based on reflection of at least at subset of the transmit signals by one or more objects. A range from the radar system associated with each of the reflected signals corresponds with a frequency of the reflected signal. The reflected signals are processed to identify and locate the one or more objects. The processing includes applying an adaptive range-selective gain control (ARSGC) to control a gain corresponding with each of the reflected signals based on the range associated with the reflected signal.

In addition to one or more of the features described herein, the applying the ARSGC is in an analog domain.

In addition to one or more of the features described herein, the method also includes providing an output of the ARSGC to an analog-to-digital converter.

In addition to one or more of the features described herein, the applying the ARSGC includes applying an adaptive frequency gain such to apply a radiometric power reduction only to input signals to the ARSGC that are below a threshold frequency.

In addition to one or more of the features described herein, the applying the ARSGC includes using a database of prior tracks of detections, wherein each track is a collection of detections associated with a same object, to predict maximum expected power, and limiting an output of an amplifier of an output of the adaptive frequency gain based on the maximum expected power.

In addition to one or more of the features described herein, the applying the ARSGC is in a digital domain.

In addition to one or more of the features described herein, the method also includes obtaining an output of an analog-to-digital converter (ADC) as an input to the ARSGC.

In addition to one or more of the features described herein, the applying the ARSGC includes using a database of prior detections or tracks of detections, wherein each track is a collection of detections associated with a same object, to predict maximum expected power.

In addition to one or more of the features described herein, the applying the ARSGC includes using the maximum expected power to perform a range-sensitive bit reduction on an output of the ADC.

In addition to one or more of the features described herein, the method also includes controlling operation of a vehicle based on a result of the processing the reflected signals.

In another exemplary embodiment, a system a radar system to transmit signals from a radar system. The transmit signals are linear frequency modulated continuous wave signals. The system also receives reflected signals based on reflection of at least at subset of the transmit signals by one or more objects. A range from the radar system associated with each of the reflected signals corresponds with a frequency of the reflected signal. A controller processes the reflected signals to identify and locate the one or more objects. The controller includes an adaptive range-selective gain control (ARSGC) to control a gain corresponding with each of the reflected signals based on the range associated with the reflected signal.

In addition to one or more of the features described herein, the ARSGC is in an analog domain.

In addition to one or more of the features described herein, the controller also provides an output of the ARSGC as an input to an analog-to-digital converter.

In addition to one or more of the features described herein, the ARSGC includes an adaptive frequency gain to apply a radiometric power reduction only to input signals to the ARSGC that are below a threshold frequency.

In addition to one or more of the features described herein, the ARSGC uses a database of prior tracks of detections. Each track is a collection of detections associated with a same object, to predict maximum expected power, and the ARSGC limits an output of an amplifier of an output of the adaptive frequency gain based on the maximum expected power.

In addition to one or more of the features described herein, the ARSGC is in a digital domain.

In addition to one or more of the features described herein, the controller also provides an output of an analog-to-digital converter (ADC) as an input to the ARSGC.

In addition to one or more of the features described herein, the ARSGC uses a database of prior detections or tracks of detections. Each track is a collection of detections associated with a same object, to predict maximum expected power.

In addition to one or more of the features described herein, the ARSGC uses the maximum expected power to perform a range-sensitive bit reduction on an output of the ADC.

In addition to one or more of the features described herein, the system is part of a vehicle and the controller controls operation of the vehicle based on a result of processing the reflected signals.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
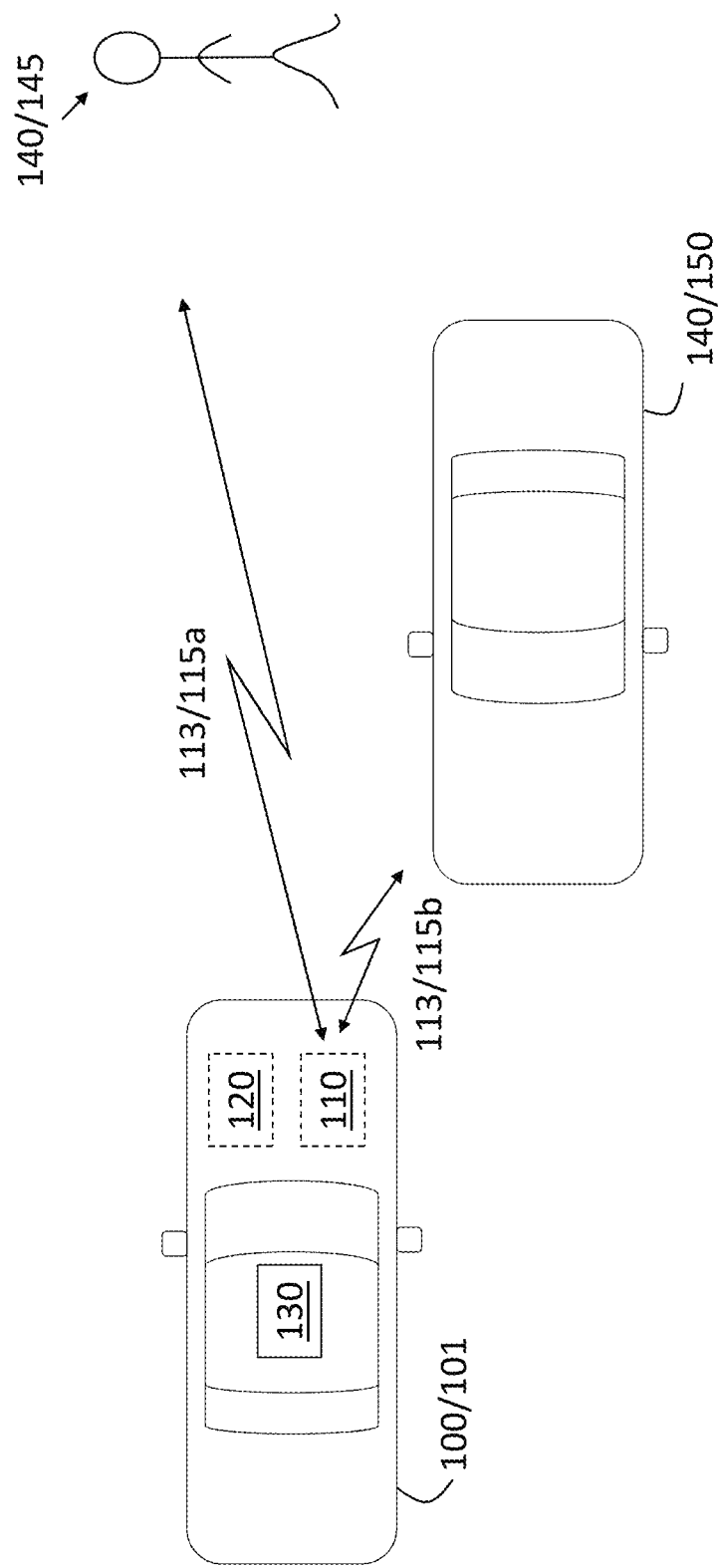
FIG. 1 is a block diagram of a vehicle that implements adaptive range-selective gain control (ARSGC) in a radar system.

The following description is merely exemplary in nature and is not intended to limit the present disclosure, its application or uses. It should be understood that throughout the drawings, corresponding reference numerals indicate like or corresponding parts and features.

As previously noted, an LFM CW radar system transmits a chirp (e.g., linearly increasing or decreasing frequency) and can detect both strong and weak signals simultaneously. The strength of a signal that is reflected by an object is determined by the radar cross section of the object and its range to the radar system. For example, a reflection from an object with a relatively large radar cross section (e.g., truck) that is closer in range will be much stronger than a reflection from a target with a relatively small radar cross section (e.g., motorcycle) that is farther in range. If the difference in signal strengths of the reflections exceeds the dynamic range of the radar system, the object providing the weaker reflection will not be detected properly.

The dynamic range of the radar system is the span between a minimum detectable signal power and a maximum detectable signal power. The minimum signal power that the receiver can detect is determined by the quantization noise generated in the analog-to-digital converter (ADC) of the radar system. The maximum signal power is the power beyond which the receiver becomes saturated; usually in the low noise amplifier (LNA) of the receiver. Another source of improper detection may be the digital dynamic range. This is a function of the number of bits used to represent the received signal by the ADC. When the signal level exceeds the value represented by the number of bits, the signal becomes saturated.

Embodiments of the systems and methods detailed herein relate to adaptive range-selective gain control (ARSGC) in a radar system. The ARSGC may be applied before or after the ADC stage in the processing of the received signals according to alternate embodiments. According to an exemplary embodiment, the received power for a reflection from an object with a relatively larger radar cross section that is closer in range is reduced. This is a form of pre-ADC gain control to affect the dynamic range of the radar system. Thus, in the above-noted exemplary situation, the power of the reflection from the truck is reduced while the reflection from the motorcycle is unchanged. According to another exemplary embodiment, range-sensitive bit filtering ensures that the least significant bits are filtered for the close-in object. This is a form of post-ADC gain control to affect the digital dynamic range of the radar system.

In accordance with an exemplary embodiment, FIG. 1 is a block diagram of a vehicle 100 that implements ARSGC in a radar system. The exemplary vehicle 100 shown in FIG. 1 is an automobile 101. The vehicle 100 is shown with a radar system 110, a controller 120, and other sensors 130 (e.g., lidar system, camera). The exemplary placement and arrangement of these components, as shown in FIG. 1, may be changed. For example, two or more other sensors 130 may be arranged anywhere in or on the vehicle 100. Two exemplary objects 140 that may be detected by the radar system 110 are shown, one is a pedestrian 145 and the other is an oncoming automobile 150. Transmissions 113 from the radar system 110 and the resulting reflections 115a, 115b (generally referred to as 115) respectively received from the pedestrian 145 and the oncoming automobile 150 are indicated. As shown in FIG. 1, the oncoming automobile 150 is closer to the vehicle 100 than the pedestrian 145. Also, the oncoming automobile 150 has a larger radar cross section than the pedestrian 145. Thus, the reflections 115b from the oncoming automobile 150 will be much stronger than the reflections 115a from the pedestrian 145.

The processing of the reflections 115 may be performed by processing circuitry within the radar system 110, by the controller 120 of the vehicle 100, or by a combination of the two. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The processing circuitry of the radar system 110 or the controller 120 implements ARSGC at the analog stage (i.e., prior to the ADC), as further discussed with reference to FIG. 2, or implements ARSGC at the digital stage (i.e., after the ADC), as further discussed with reference to FIG. 3.

Figure 2:
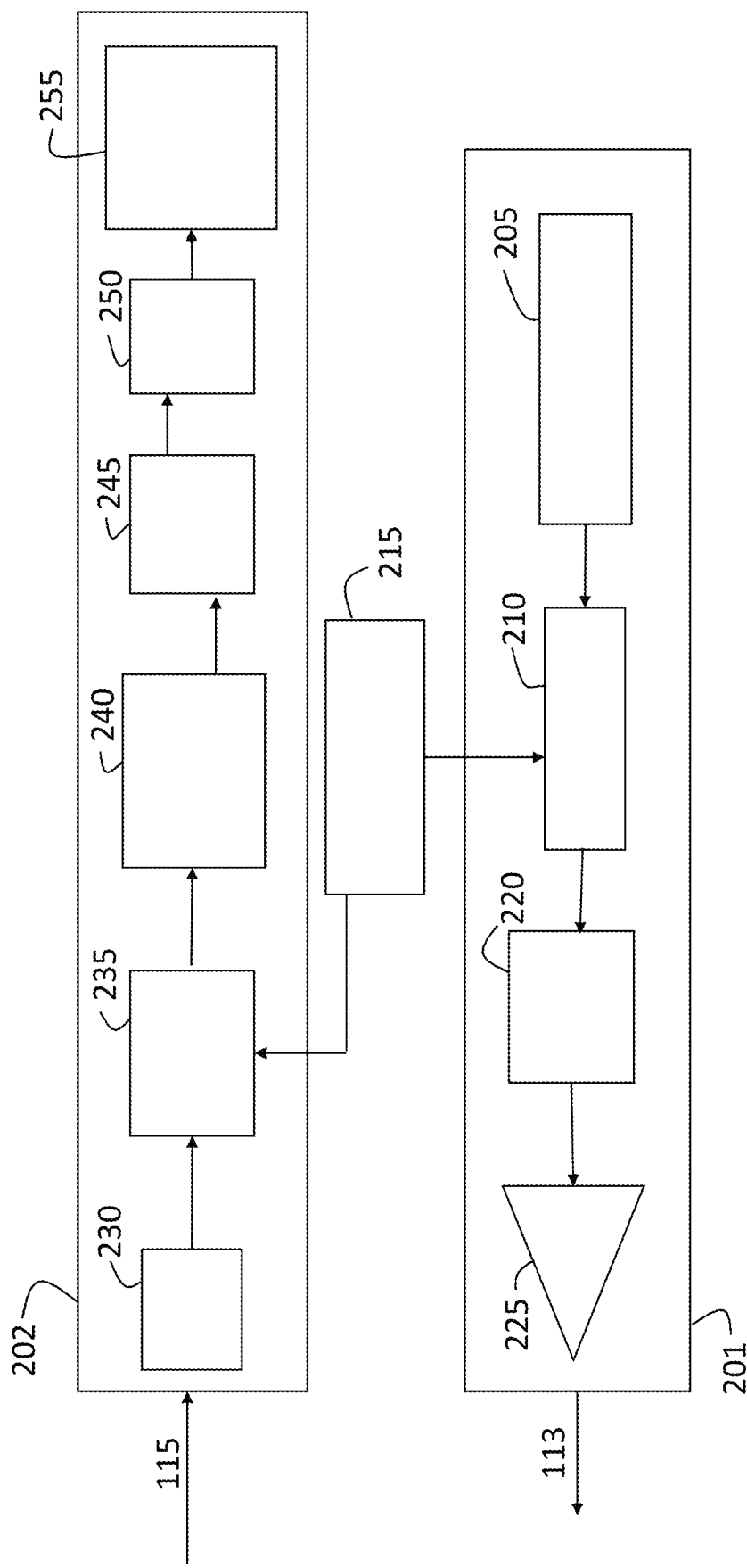
FIG. 2 is a block diagram of components and processes associated with the radar system that include ARSGC in the analog stage according to one or more embodiments.

FIG. 2 is a block diagram of components and processes associated with the radar system 110 that include ARSGC 245 in the analog stage according to one or more embodiments. Transmit-side components and processes 201 involved in generating transmissions 113 and receive-side components and processes 202 involved in handling reflections 115 are shown. The transmit-side components and processes 201 include a signal generator 205 to generate a signal and an up-converter 210 to increase a frequency of the generated signal. A local oscillator 215 is used by the up converter 210. In a vehicle-based application, the up-converted signal may be on the order of 77 gigahertz. A phase shifter 220 is used to shift the phase of the up-converted signal. An amplifier 225 is used to amplify the phase-shifted signal. This amplified signal is emitted as a transmission 113.

When a reflection 115 is received, a low noise amplifier (LNA) 230 is used to amplify the reflection 115. The resulting amplified signal is down-converted, by a down converter 235, which uses the same local oscillator 215 as the up converter 210, according to the exemplary embodiment shown in FIG. 2. Stretch processing, at block 240, involves several components such as a mixer, linear frequency modulation generator, timing circuitry, and a spectrum analyzer. The result of stretch processing is a range estimation. According to an exemplary embodiment, the ARSGC 245 is implemented prior to conversion to the digital domain by an ADC 250. The adaptive range-selective nature of the gain control of the ARSGC 245 is further discussed with reference to FIG. 3. Additional processing, at block 255, in the digital domain results in the detection and positioning of objects 140 that provide the reflections 115. Other than the ARSGC 245, all the transmit-side components and processes 201 and the receive-side components and processes 202 are well-known and are not discussed in detail herein.

Figure 3:
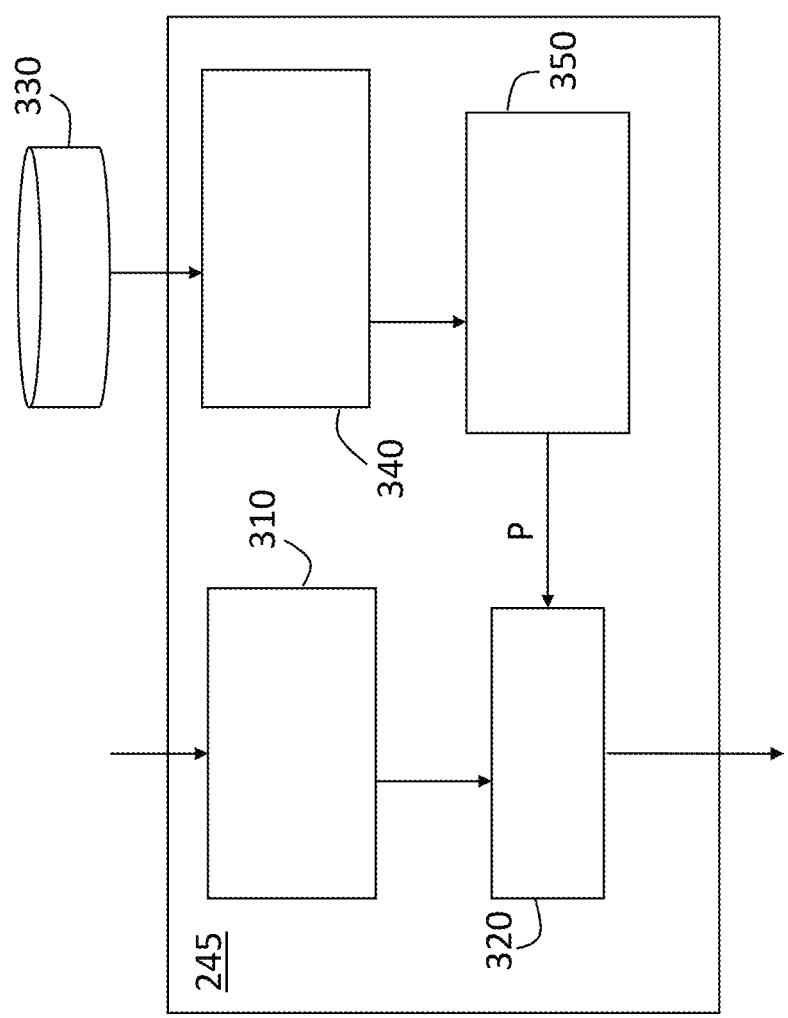
FIG. 3 is a block diagram of components and processes involved in performing ARSGC according to one or more embodiments.

FIG. 3 is a block diagram of components and processes that make up the ARSGC 245 according to one or more embodiments. The ARSGC 245 is a linear time-invariant filter that has a frequency response corresponding with a signal propagation of $1/R^4$, where R is the range. A filter 310 provides an adaptive frequency gain such that the signal coming into the ARSGC 245 is affected differently by the filter 310 according to the frequency of the signal, which corresponds to a range. The filter 310 is a fixed filter with a frequency response $H_1(f)$ given by:

$$H_1(f) = \begin{cases} \left(\frac{2\alpha}{cf}\right)^4, & f < f_0 \\ 1, & f > f_0 \end{cases} \quad [\text{EQ. 1}]$$

As EQ. 1 indicates, the frequency response $H_1(f)$ is different for frequencies above and below a cutoff frequency $f_0$. In an LFM CW radar system, the range R to a detected object 140 is perceived as frequency f. That is, the frequency f may be expressed as:

$$f = \frac{2\alpha R}{c} \quad [\text{EQ. 2}]$$

In EQ. 2, $\alpha$ is the slope of the chirp (i.e., the linear LFM signal) and c is the speed of light. Thus, below the cutoff frequency $f_0$, which corresponds with a cutoff range (i.e., for objects 140 that are located within the cutoff range), the filter 310 performs a radiometric power reduction on the incoming signal, according to EQ. 1. Above the cutoff frequency $f_0$, which corresponds with a cutoff range, the filter 310 does not modify the incoming signal. The output of the filter 310 is provided to the amplifier 320.

In addition to the output of the filter 310, the amplifier 320 also obtains an indication of the predicted power P of the strongest object 140 (i.e., the object 140 that provides the highest-power reflection 115). The frequency response $H_2(f)$ at the amplifier 320 is given by:

$$H_2(f) = \begin{cases} B, & f < f_0 \\ 1, & f > f_0 \end{cases} \quad [\text{EQ. 3}]$$

$$B = \max\left(\frac{K}{P}\left(\frac{cf_1}{2\alpha}\right)^4, \frac{T}{CM}\right) \quad [\text{EQ. 4}]$$

In EQ. 4, K is the signal power goal (i.e., the desired signal power), $f_1$ is the predicted frequency for an object 140 corresponding with the predicted range, T is the detection threshold, M is the minimal required target radar cross section that is required for detection, and C is given by:

$$C = \frac{P_t G_t G_r \lambda^2}{(4\pi)^3 L} \quad [\text{EQ. 5}]$$

In EQ. 5, $P_t$ is the transmit power, $G_t$ is the transmit gain, $G_r$ is the receive gain, $\lambda$ is the wavelength of the transmission 113, and L represents the losses. CM represents the minimal power required for an object 140 to be detected. The predicted power P of the strongest object 140 may change for each frame. Thus, the ARSGC 245 is adjustable.

The database 330 is a database of all detected objects 140 with detections associated with the same object 140. According to an exemplary embodiment associated with the embodiment shown in FIG. 2, the radar system 110 includes a tracker such that detections associated with the same object 140 are grouped as a track of that object 140. Thus, the database 330 may be a database of detections or of tracks according to alternate embodiments. The database 330 is updated each time an object 140 is detected, and, in the case of the database 330 storing tracks, that detection is added to an existing track if the detection pertains to a previously detected object 140. Finding the maximum power detection or track, at block 340, refers to searching the database 330 to find the strongest detection or track (i.e., highest power reflection 115). At block 350, predicting object power refers to predicting the current power (i.e., signal strength) for the object 140 associated with the maximum power detection or track (found at block 340). This prediction is output as the predicted power P of the strongest object 140 to the amplifier 320.

Specifically, the current range $R_{current}$ to the object 140 associated with the maximum power detection or track (found at block 340) is predicted as:

$$R_{current} = R_{last} + \text{Doppler} \cdot \Delta t \quad [\text{EQ. 6}]$$

In EQ. 6, $R_{last}$ is the estimated range from the previous dwell time on the object 140 associated with the maximum power detection or track, Doppler is the Doppler (i.e., range rate) of the maximum power detection or track, and $\Delta t$ is the time difference between the previous dwell time to the current dwell time. The predicted current range $R_{current}$ is then used to predict the current signal power of the object 140 associated with the maximum power detection or track (i.e., the predicted power P) based on the signal propagation over the range, as given by the radar equation:

$$P = \left(\frac{R_{last}}{R_{current}}\right)^4 \cdot P_{last} \quad [\text{EQ. 7}]$$

The previous power of the object 140 $P_{last}$ is measured. According to the embodiment shown in FIG. 2, the amplifier 320 output is provided to the ADC 250.

Figure 4:
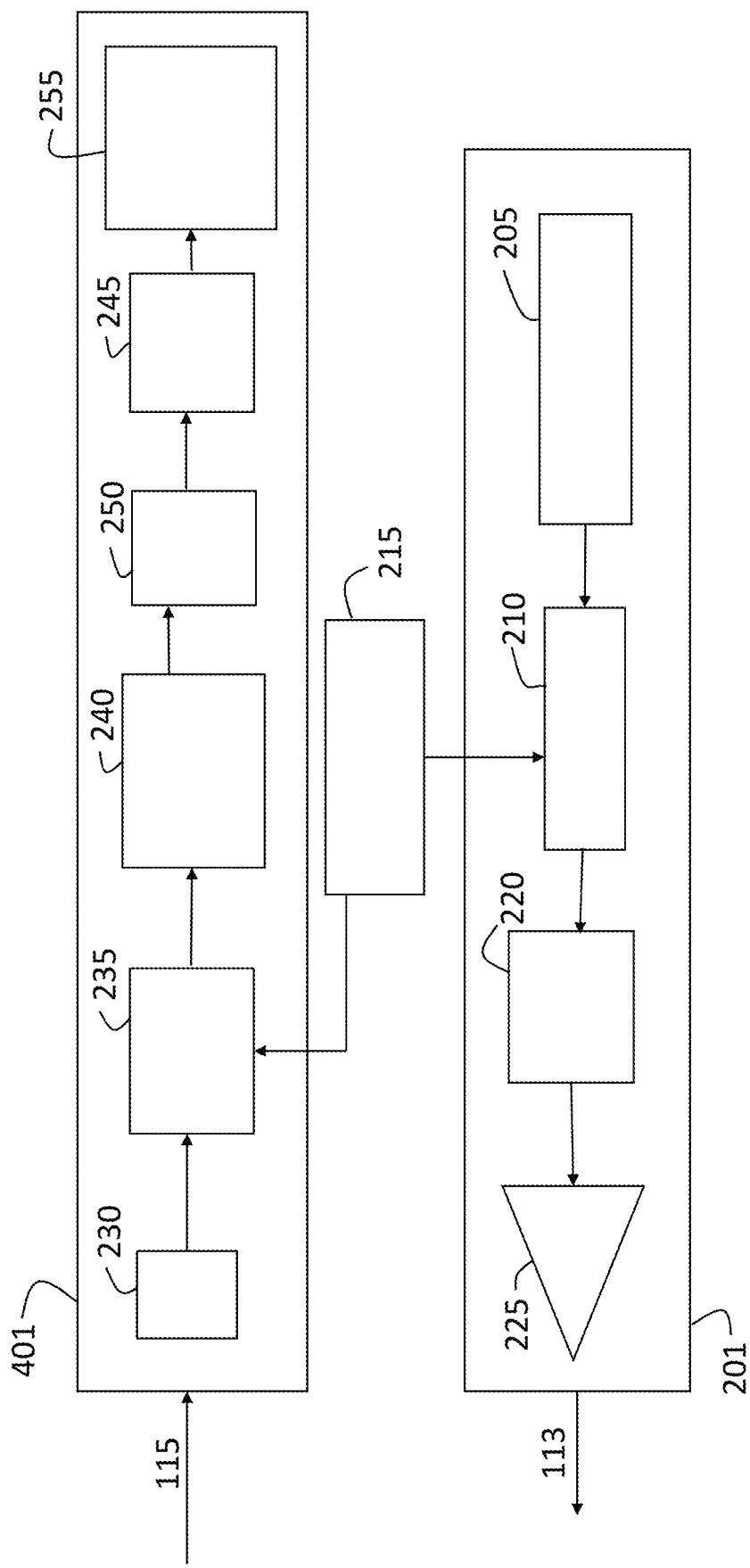
FIG. 4 is a block diagram of components and processes associated with the radar system that include ARSGC in the digital stage according to one or more embodiments.

FIG. 4 is a block diagram of components and processes associated with the radar system 110 that include ARSGC 245 in the digital stage according to one or more embodiments. According to the embodiment shown in FIG. 4, with continuing reference to FIGS. 1-3, the radar system 110 may not include a tracker and, as such, the ARSGC 245 may involve finding a maximum power detection (at block 340) rather than a track. When this is the case, the value of K may be increased to compensate for the fact that the estimate of the predicted power P is likely to be less accurate when using detections rather than a track. As FIG. 4 indicates, the transmit-side components and processes 201 are identical to those shown in FIG. 2. The receive-side components and processes 401 differ in the order in which the ADC 250 and the ARSGC 245 are implemented. Specifically, according to the embodiment shown in FIG. 4, the ARSGC 245 is implemented after the conversion to the digital domain by the ADC 250. When this configuration is used, the filter 310 and the amplifier 320 are implemented with digital components that have finite impulse response (FIR). As previously noted, the ARSGC 245 in the digital domain ensures range-sensitive bit filtering.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method, comprising:
   transmitting transmit signals from a radar system, wherein the transmit signals are linear frequency modulated continuous wave signals;
   receiving reflected signals at the radar system based on reflection of at least a subset of the transmit signals by one or more objects, wherein a range from the radar system associated with each of the reflected signals corresponds with a frequency of the reflected signal;
   processing the reflected signals to identify and locate the one or more objects, the processing including applying an adaptive range-selective gain control (ARSGC), after application of a low noise amplifier and prior to detection of one or more objects, to control a gain corresponding with each of the reflected signals based on the range associated with the reflected signal.

2. The method according to claim 1, wherein the applying the ARSGC is in an analog domain.

3. The method according to claim 2, further comprising providing an output of the ARSGC to an analog-to-digital converter.

4. The method according to claim 2, wherein the applying the ARSGC includes applying an adaptive frequency gain such to apply a radiometric power reduction only to input signals to the ARSGC that are below a threshold frequency.

5. The method according to claim 4, wherein the applying the ARSGC includes using a database of prior tracks of detections, wherein each track is a collection of detections associated with a same object, to predict maximum expected power, and limiting an output of an amplifier of an output of the adaptive frequency gain based on the maximum expected power.

6. The method according to claim 1, wherein the applying the ARSGC is in a digital domain.

7. The method according to claim 6, further comprising obtaining an output of an analog-to-digital converter (ADC) as an input to the ARSGC.

8. The method according to claim 7, wherein the applying the ARSGC includes using a database of prior detections or tracks of detections, wherein each track is a collection of detections associated with a same object, to predict maximum expected power.

9. The method according to claim 8, wherein the applying the ARSGC includes using the maximum expected power to perform a range-sensitive bit reduction on an output of the ADC.

10. The method according to claim 1, further comprising controlling operation of a vehicle based on a result of the processing the reflected signals.

11. A system, comprising:
    a radar system configured to transmit signals, wherein the transmit signals are linear frequency modulated continuous wave signals, and to receive reflected signals based on reflection of at least at subset of the transmit signals by one or more objects, wherein a range from the radar system associated with each of the reflected signals corresponds with a frequency of the reflected signal;
    a controller configured to process the reflected signals to identify and locate the one or more objects, the controller including an adaptive range-selective gain control (ARSGC), after a low noise amplifier and prior to detection of one or more objects, to control a gain corresponding with each of the reflected signals based on the range associated with the reflected signal.

12. The system according to claim 11, wherein the ARSGC is in an analog domain.

13. The system according to claim 12, wherein the controller is further configured to provide an output of the ARSGC as an input to an analog-to-digital converter.

14. The system according to claim 12, wherein the ARSGC includes an adaptive frequency gain configured to apply a radiometric power reduction only to input signals to the ARSGC that are below a threshold frequency.

15. The system according to claim 14, wherein the ARSGC uses a database of prior tracks of detections, wherein each track is a collection of detections associated with a same object, to predict maximum expected power, and the ARSGC is configured to limit an output of an amplifier of an output of the adaptive frequency gain based on the maximum expected power.

16. The system according to claim 11, wherein the ARSGC is in a digital domain.

17. The system according to claim 16, wherein the controller is further configured to provide an output of an analog-to-digital converter (ADC) as an input to the ARSGC.

18. The system according to claim 17, wherein the ARSGC uses a database of prior detections or tracks of detections, wherein each track is a collection of detections associated with a same object, to predict maximum expected power.

19. The system according to claim 18, wherein the ARSGC is configured to use the maximum expected power to perform a range-sensitive bit reduction on an output of the ADC.

20. The system according to claim 11, wherein the system is part of a vehicle and the controller is further configured to control operation of the vehicle based on a result of processing the reflected signals.

* * * * *